3,279,910
METHOD OF INDUCING GENERATIVE ORGANS IN PLANTS
Johan Bruinsma, Bennekom, Netherlands, assignor to Hoffmann-La Roche Inc., Nutley, N.J., a corporation of New Jersey
No Drawing. Filed Mar. 4, 1964, Ser. No. 349,461
Claims priority, application Netherlands, Mar. 13, 1963, 290,151
6 Claims. (Cl. 71—2.5)

It is well known that the growth of many plants can be influenced by temperature. The influence of chilling on soaked seeds and young plants is especially important to agriculture; the absence of a frost period during the winter may result in a failure of spike-forming on winter cereals and, therefore, lead to bad crops. For this reason, there is a long-felt need for a method that permits the voluntary induction of the generative phase in plants.

It has been found that tocopherols possess such inductive power. The present invention relates, therefore, to a method of inducing the formation of generative organs in plants during the vegetative phase, which consists in treating the plants with an aqueous or powdered dispersion of tocopherol or a mixture of tocopherols.

The tocopherols can be used as such or in the form of their esters, such as the acetate or phosphate. The natural vitamin E (d-α-tocopherol) can be used for the purpose of this invention just as well as the synthetic substances, especially d,l-α-tocopherol, d,l-γ-tocopherol, etc. The amounts to be used lie within the concentration range of the usual plant hormones. The preferred working concentration will be from 3 to 500 parts by weight of tocopherol per million parts by weight of the dispersion used.

The aqueous, tocopherol-containing dispersion used for the purpose set forth above can advantageously be prepared with nonionic emulsifiers, especially polyoxyethylene esters of higher fatty acids, such as polyoxyethylene stearate and oleate; or polyoxyethylene sorbitan esters of higher fatty acids, such as polyoxyethylene sorbitan laurate; or polyoxyethylene ethers, such as polyoxyethylene-oleyl ether and polyoxyethylene-polyoxypropylene ether.

Powdered preparations are conveniently prepared with usual lubricant or carrier materials, such as talc, silicic acid, calcium phosphate, etc.

It has been found that the tocopherols are most active when they enter the plants through the leaves. Thus, an advantageous mode of carrying out the method of this invention is to treat the plants with the tocopherol-containing dispersion by spraying or dusting.

*Example*

Pektus winter rye plants (*Secale cereale* L.), one per pot, were grown in the green house on sand with a Hoagland nutrient solution from April 15 on, under natural daylight conditions. From June 6, 24 plants (having each 6–10 fully expanded leaves) were daily sprayed, 9 times in all, with 25 ml. of a solution prepared by diluting 1 ml. of 3.5% solution of d,l-α-tocopherol in 96% ethanol with water to 500 ml. volume and adding 0.02% of polyoxyethylene-polyoxypropylene ether. The control plants, having been cultivated in similar conditions, were sprayed with water.

After the spraying period the plants were allowed to develop for another five weeks and examined on vegetative and generative characteristics. It could then be observed that the control plants remained vegetative, whereas all the plants treated with d,l-α-tocopherol developed a distinct spike primordium with a medium spike length of 1.5 mm.

I claim:
1. A method of inducing the formation of generative organs in plants during the vegetative phase which comprises applying to said plants a dispersion containing, as the active ingredient, a member selected from the group consisting of tocopherol, tocopherol acetate, tocopherol phosphate and mixtures thereof, there being present in said dispersion from 3 to 500 parts by weight of said active ingredient per million parts of said dispersion.
2. The method of claim 1 wherein the said dispersion is applied to the plants by dusting.
3. The method of claim 1 wherein the said dispersion is applied to the plants by spraying.
4. The method of claim 1 wherein a powdered dispersion is employed.
5. The method of claim 1 wherein an aqueous dispersion is employed.
6. The method of claim 5 wherein the aqueous dispersion contains also a non-ionic emulsifier.

References Cited by the Examiner
FOREIGN PATENTS
497,736  11/1953  Canada.

OTHER REFERENCES
Kofler: Chem. Abstract, vol. 42, 491a, 1948.
Lumiere: Chem Abstract, vol 15, 2469[3], 1921.
McDouglas: Chem Abstract, vol. 15, 3660[7], 1921.
Minkowski: Chem. Abstract, vol. 55, 26172C, 1961.

LEWIS GOTTS, *Primary Examiner*.

JAMES O. THOMAS, JR., *Examiner*.

A. J. ADAMCIK, *Assistant Examiner*.